(12) United States Patent
Strandberg

(10) Patent No.: US 7,248,489 B2
(45) Date of Patent: Jul. 24, 2007

(54) CONTROL OF THE MAINS BRIDGE OF A FREQUENCY CONVERTER

(75) Inventor: Stefan Strandberg, Vörá (FI)

(73) Assignee: Vacon Oyj, Vaasa (FI)

( * ) Notice: Subject to any disclaimer, the term of this patent is extended or adjusted under 35 U.S.C. 154(b) by 36 days.

(21) Appl. No.: 11/153,607

(22) Filed: Jun. 16, 2005

(65) Prior Publication Data

US 2005/0281068 A1   Dec. 22, 2005

(30) Foreign Application Priority Data

Jun. 17, 2004   (FI) ................................. 20040837

(51) Int. Cl.
*H02M 5/458*   (2006.01)
(52) U.S. Cl. .................... 363/37; 363/98; 318/800; 318/803
(58) Field of Classification Search ............ 363/34–41, 363/98, 132, 79, 80, 131; 318/772–774, 318/798–812, 254, 256
See application file for complete search history.

(56) References Cited

U.S. PATENT DOCUMENTS 4,609,983 A * 9/1986 Braun ......................... 363/98

6,801,441 B2 * 10/2004 Salama ....................... 363/37

FOREIGN PATENT DOCUMENTS

| EP | 0606501 B1 | 12/1997 |
| FI | 108819 B | 3/2002 |
| FI | 1147760 B | 12/2004 |
| JP | 62104481 A | 5/1987 |
| JP | 06327291 A | 11/1994 |

* cited by examiner

*Primary Examiner*—Rajnikant B. Patel
(74) *Attorney, Agent, or Firm*—Birch, Stewart, Kolasch, & Birch, LLP

(57) ABSTRACT

A method and a system for controlling the mains bridge of a four-quadrant PWM frequency converter provided with a direct-voltage intermediate circuit when power is flowing into the supply network. The mains bridge includes a controlled mains bridge (INU) for rectification of the mains voltage to produce a DC intermediate-circuit direct voltage ($U_{DC}$) consisting of arms conducting during the positive and negative half cycles of the phase voltage of each phase of the supply network, each arm having a switch unit formed by a diode (D1–D6) and a power semiconductor switch (V1–V6), e.g. an IGBT, connected in inverse-parallel with it.

6 Claims, 2 Drawing Sheets

CONTROL OF THE MAINS BRIDGE OF A FREQUENCY CONVERTER

CROSS-REFERENCE TO RELATED APPLICATION

The present application claims priority under 35 U.S.C. §119 to Finnish patent application No. 2004-0837, filed Jun. 17, 2004, the entire contents of which are hereby incorporated by reference.

BACKGROUND OF THE INVENTION

1. Field of the Invention

The present invention relates to a method for controlling the mains bridge of a four-quadrant frequency converter and to a mains bridge.

2. Description of Background Art

Adjustable electric motor drives controlled by a frequency converter often need to have a braking ability. The braking energy can be fed either into a resistor, which will convert it to heat, or back to the supply network, thus allowing it to be utilized elsewhere. Regeneration of braking energy to the mains is considerably more expensive to implement than resistor braking, so it is only advantageous to use when the braking energy saved is sufficiently significant in an economical sense.

An advantageous possible way of implementing regenerative braking is to use between the supply mains and the DC intermediate circuit a full-wave bridge circuit (a so-called FFE unit) controlled by the mains frequency. The FFE unit consists of an inverter unit and an AC inductor. FIG. 1 presents a four-quadrant FFE unit of a three-phase voltage-controlled PWM frequency converter, said unit comprising a controlled mains bridge INU connected to the supply network L1–L3 for rectifying the mains voltage to produce a DC intermediate-circuit direct voltage $U_{DC}$. The mains bridge consists of arms conducting during the positive and negative half cycles of the phase voltage of each supply network phase, each arm having a switch unit formed by a diode D1–D6 and a power semiconductor switch V1–V6, e.g. an IGBT, connected in inverse-parallel with it. The diodes are conducting when power is flowing from the mains into the motor, and the semiconductor switches are conducting during regenerative braking when power is flowing from the motor into the mains. The power stage of the inverter is identical to that in the motor feeding application, differing from it in the FFE application only in respect of the control system. An AC inductor $L_{AC}$ is used as a filter to limit the mains current harmonics.

In regenerative braking (generator use), the power semiconductor switches of the FFE are controlled in such a way that the switch V1, V2, V3 (conducting during the positive half cycle) in the upper arm of each phase is turned on substantially for as long a time as the supply network phase voltage $U_{L1}$, $U_{L2}$, $U_{L3}$ corresponding to it is the most positive of all the phase voltages, and similarly the switch V4, V5, V6 (conducting during the negative half cycle) in the lower arm is turned on substantially for as long a time as the corresponding phase voltage is the most negative of all the phase voltages. FIG. 2 illustrates this type of control of the power semiconductor switches. In a motor drive, the power semiconductor switches of the FFE need not necessarily be controlled at all because the current flows continuously through the diodes.

The method of controlling the FFE requires synchronization with the supply network. A prior-art method of implementing the synchronization is to measure the network voltages by means of a specific auxiliary card and feed the measurement data to the control unit of the FFE. The voltage measurement is thus of a nature susceptible to disturbances, which, besides the operation of the FFE's own power switches, may also be caused by other devices connected to the same supply network. Especially in weak networks, the voltage to be measured and therefore also the measurement signal may contain many disturbances, impairing synchronization accuracy. The effect of disturbances can be dampened by filtering the measurement result, but this again induces a phase shift in the measurement signal, which also makes accurate synchronization with the network more difficult.

SUMMARY AND OBJECTS OF THE INVENTION

The object of the present invention is to overcome the drawbacks of prior art and to achieve a new type of control method for controlling a mains bridge capable of regenerative braking and a new mains bridge capable of regenerative braking.

The solution of the invention is based on a principle whereby, according to the invention, utilizing the phase-specific current measurement normally comprised in the inverter unit, inferences and required corrective measures are taken regarding correctness of synchronization on the basis of the current measurement data. This makes it possible to use physically exactly identical inverter units in both motor feeding applications and regenerative braking applications by only changing the software. In respect of manufacture and spare parts, this is a great advantage.

In the method of the invention, a virtual three-phase network is created and the power switches are controlled according to it. From the curve forms of the phase currents, inferences are then made as to whether the virtual network is correctly synchronized with the supply network, and if this is not the case, then the synchronization is corrected in the appropriate direction one step at a time until the current measurement shows that the synchronization is correct.

In the method of the present invention, no mains voltage measurement is needed in the generation of the control pulses.

The features of the method of the invention for controlling a mains bridge are presented in detail in the claims below.

BRIEF DESCRIPTION OF THE DRAWINGS

In the following, the invention will be described in detail with reference to an example and the attached drawings, wherein.

DETAILED DESCRIPTION OF THE PREFERRED EMBODIMENTS

Figure 1:
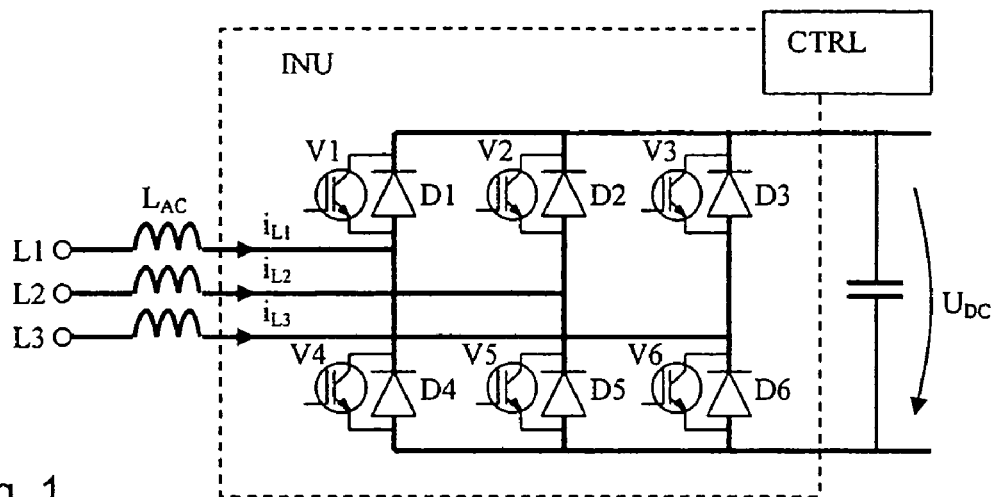
FIG. 1 presents a prior-art mains bridge capable of regenerative braking, provided with inductors.
Figure 2:
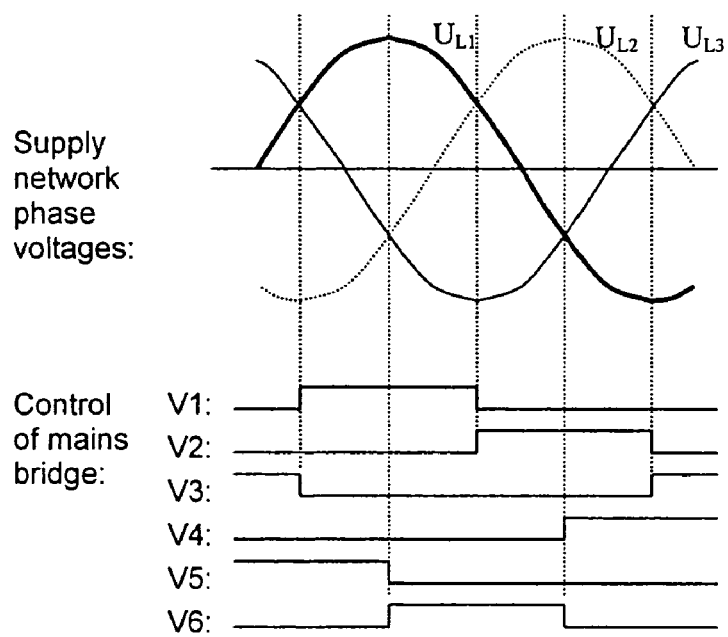
FIG. 2 presents the phase voltages of the supply network.

The mains bridge INU of a three-phase voltage-controlled PWM frequency converter presented in FIG. 1, which is controlled by a control unit CTRL, comprises measurement of the current $I_{L1}$, $I_{L2}$, $I_{L3}$ of each phase of the supply network.

In the control according to the invention, a virtual three-phase network is created and the power switches are controlled according to it. From the curve forms of the phase currents, inferences are made as to whether the virtual network is correctly synchronized with the supply network, and if this is not the case, the synchronization is corrected in the appropriate direction one step at a time until the current measurement shows that the synchronization is correct.

Figure 4:
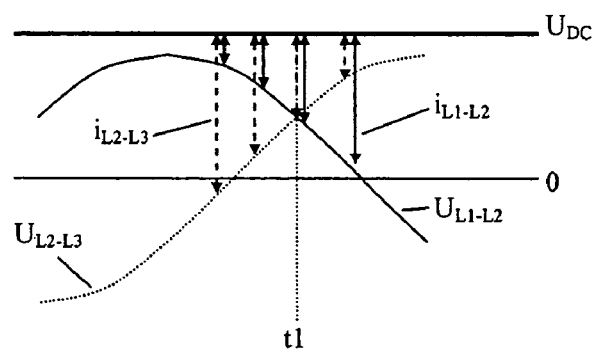
FIG. 4 illustrates the operation of determining the supply network frequency and phase sequence by means of IGBT current pulses.

After switch-on of power, the frequency and phase sequence of the virtual network can be inferred e.g. from the phase currents $I_{L1}$, $I_{L2}$, $I_{L3}$ because normally in the starting situation the device is functioning in motor mode with the current flowing through the diodes. The frequency and phase sequence of the supply network can also be determined by means of short-duration two-phase IGBT control pulses by driving the IGBT in the upper arm of one phase and the IGBT in the lower arm of another phase into conduction for a short time, e.g. 20 µs, at a time. The magnitude of the current pulse thus obtained depends on the voltage difference between the intermediate-circuit voltage $U_{DC}$ and the phase-to-phase voltage between the two phases in question. By repeating such two-phase test pulses with several different phase combinations at intervals of e.g. 500 µs, it is possible to infer the mutual phase sequence and phasing of the phase-to-phase voltages. The situation is visualized by FIG. 4, which shows two phase-to-phase voltages $U_{L1-L2}$ and $U_{L2-L3}$ and the intermediate-circuit voltage $U_{DC}$ (which is shown in the drawing at a level higher than the normal level). The lengths of the vertical arrows are proportional to the current pulses which, for the phase-to-phase voltages shown in the figure, are produced during the two-phase control pulse, and from their length it is possible to determine e.g. the instant t1 at which these phase-to-phase voltages are equal.

Figure 3:
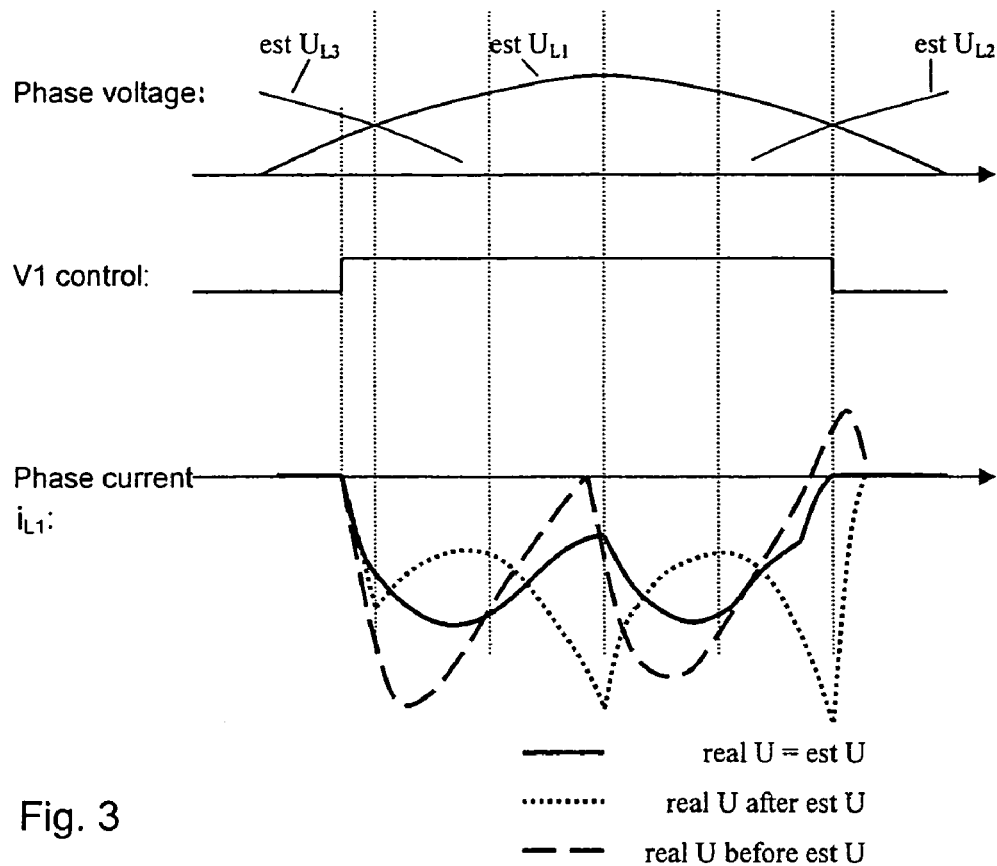
FIG. 3 illustrates the method of the invention for controlling the mains bridge.

For synchronization of the virtual network, samples are taken from the phase currents $I_{L1}$, $I_{L2}$, $I_{L3}$ during the time when, on the basis of the control commands according to the virtual network, the current should be flowing. The samples can be taken at equal intervals or e.g. by using a denser sampling interval at the beginning and end of the conduction cycle. The inference as to whether the synchronization is correctly timed can be made, e.g. in a braking situation as illustrated in FIG. 3, on the basis of a sample taken from phase current $I_{L1}$ at the end of a conduction cycle of V1 of IGBT, as follows:

- if the latest sample is about 0, then the synchronization of the virtual network is correct and does not need to be changed (real U=est U)
- if the latest sample is of "incorrect sign", i.e. on the motor side, then the virtual network is early and it has to be retarded (real U before est U)
- if the latest sample is on the generator side but of considerable amplitude, then the virtual network is late and it has to be advanced (real U after est U).

It is obvious to the person skilled in the art that different embodiments of the invention are not limited to the example described above, but that they may be varied within the scope of the claims presented below.

The invention claimed is:

1. A method for controlling the mains bridge of a four-quadrant PWM frequency converter provided with a direct-voltage intermediate circuit when power is flowing into the supply network, said mains bridge comprising a controlled mains bridge (INU) for rectification of the mains voltage to produce a DC intermediate-circuit direct voltage ($U_{DC}$) consisting of arms conducting during the positive and negative half cycles of the phase voltage of each phase of the supply network, each arm having a switch unit formed by a diode (D1–D6) and a power semiconductor switch (V1–V6), e.g. an IGBT, connected in inverse-parallel with it, wherein the mains bridge (INU) is controlled in such a way that, when power is flowing into the supply network, the switch (V1, V2, V3) (conducting during the positive half cycle) in the upper arm of each phase is turned on substantially for as long a time as the supply network phase voltage ($U_{L1}$, $U_{L2}$, $U_{L3}$) corresponding to it is the most positive of all the phase voltages and the switch (V4, V5, V6) (conducting during the negative half cycle) in the lower arm is turned on substantially for as long a time as the corresponding phase voltage is the most negative of all the phase voltages, wherein in the method compromises the following steps:

creating a virtual three-phase network having the same frequency with the actual supply network is, controlling the power semiconductor switches are controlled on the basis of the voltages of the virtual network, when power is flowing into the supply network, measuring the supply network phase currents, and making inferences are made as to whether the virtual network is correctly synchronized with the supply network and, if necessary, the phase shift of the virtual network is corrected so as to keep it synchronized with the supply network based on the curve form of the measured phase currents.

2. The method according to claim 1, wherein the method comprises determining the frequency and direction of rotation of the actual supply network, which are needed for creating the virtual network, via phase current measurements:

in connection with start-up, in which situation power is flowing into the motor, during operation when power is flowing into the motor.

3. The method according to claim 1, wherein the method comprises determining the frequency and direction of rotation of the actual supply network, which are needed for creating the virtual network, via phase current measurements before starting actual operation by means of short-duration two-phase IGBT control pulses, by driving the IGBT in the upper arm of one phase and the IGBT in the lower arm of another phase into conduction for a short time at a time and repeating such two-phase test pulses with several different phase combinations.

4. A system for controlling the mains bridge of a four-quadrant PWM frequency converter provided with a direct-voltage intermediate circuit when power is flowing into the supply network, said frequency converter having a control unit (CTRL), said mains bridge comprising a controlled mains bridge (INU) for rectification of the mains voltage to produce a DC intermediate-circuit direct voltage ($U_{DC}$) consisting of arms conducting during the positive and negative half cycles of the phase voltage of each phase of the supply network, each arm having a switch unit formed by a diode (D1–D6) and a power semiconductor switch (V1–V6), e.g. an IGBT, connected in inverse-parallel with it, wherein the mains bridge (10) is controlled in such a way that, when power is flowing into the supply network, the switch (V1, V2, V3) (conducting during the positive half cycle) in the upper arm of each phase is turned on substantially for as long a time as the supply network phase voltage ($U_{L1}$, $U_{L2}$, $U_{L3}$) corresponding to it is the most positive of all the phase voltages and the switch (V4, V5, V6) (conducting during the negative half cycle) in the lower arm is turned on substantially for as long a time as the corresponding phase voltage is the most negative of all the phase voltages, wherein in the system a virtual three-phase network which in phase with the actual supply network is created, based on the curve form of the measured phase currents, inferences are made as to whether the virtual network is correctly synchronized with the supply network and, if necessary, the phase shift of the virtual network is corrected so as to keep it synchronized with the supply network.

5. The system according to claim 4, wherein the system comprises determining the frequency and direction of rotation of the actual supply network, which are needed for creating the virtual network, via phase current measurements:

in connection with start-up, in which situation power is flowing into the motor, during operation when power is flowing into the motor.

6. The system according to claim 4, wherein the system comprises determining the frequency and direction of rotation of the actual supply network, which are needed for creating the virtual network, via phase current measurements before starting actual operation by means of short-duration two-phase IGBT control pulses, by driving the IGBT in the upper arm of one phase and the IGBT in the lower arm of another phase into conduction for a short time at a time and repeating such two-phase test pulses with several different phase combinations.

* * * * *